United States Patent [19]
Nagano

[11] Patent Number: 5,126,860
[45] Date of Patent: Jun. 30, 1992

[54] OPTICAL READING APPARATUS

[75] Inventor: Fumikazu Nagano, Yamatokoriyama, Japan

[73] Assignee: Sharp Kabushiki Kaisha, Osaka, Japan

[21] Appl. No.: 481,159

[22] Filed: Feb. 20, 1990

[30] Foreign Application Priority Data

Feb. 20, 1989 [JP] Japan .................................. 1-41376

[51] Int. Cl.$^5$ ............................................. H04N 1/04
[52] U.S. Cl. .................................. 358/471; 358/474; 358/487
[58] Field of Search ............... 358/471, 474, 494, 496, 358/497, 406, 487, 400, 401, 443

[56] References Cited

U.S. PATENT DOCUMENTS

| | | | |
|---|---|---|---|
| 4,568,984 | 2/1986 | Juergensen et al. | 358/293 |
| 4,816,903 | 3/1989 | Utsuda et al. | 358/487 |
| 4,893,196 | 1/1990 | Koshiyouji et al. | 358/474 |
| 4,989,099 | 1/1991 | Koshiyouji et al. | 358/487 |

FOREIGN PATENT DOCUMENTS

0097724 1/1984 European Pat. Off.
61-54759 3/1986 Japan.

OTHER PUBLICATIONS

IBM Technical Disclosure Bulletin, vol. 19, No. 4, Sep. 1976, pp. 1355–1356, J. R. Hattersley: "Signal Processor for photodiode line scanners".

Primary Examiner—Edward L. Coles, Sr.
Assistant Examiner—Thomas D. Lee
Attorney, Agent, or Firm—Nixon & Vanderhye

[57] ABSTRACT

An optical reading apparatus which can read both transparent and reflective originals is disclosed. The apparatus comprises: a transparent plate for supporting on the upper face an original from which information is to be read; a light source disposed below the plate; and optical reading unit disposed below the plate and having a converter information read from the original into electric signals; and a processor for processing these signals, and further comprises: a further optical reading unit disposed above the upper face of the plate and having another converter for converting information read from the original into further electric signals; and a switch for selecting either of the electric signals and the further electric signals to be supplied to the processor.

5 Claims, 7 Drawing Sheets

OPTICAL READING APPARATUS

BACKGROUND OF THE INVENTION

1. Field of the Invention

This invention relates to an optical reading apparatus, and more particularly to an optical reading apparatus which can optically read information from both of two kinds of documents or the like: a document or the like in which information is born on an optically reflective body (hereinafter referred to as "a reflective original"); and a document or the like in which information is born on an optically transparent body (hereinafter referred to as "a transparent original").

2. Description of the Prior Art

In a conventional optical reading apparatus, as shown in FIG. 10, a reflective original 117 from which information is to be read is placed with the side to be read face down on top of a transparent glass table 116 of an original table. The apparatus of FIG. 10 comprises an optical reading unit 110 which includes a mirror 112, a lens 113, and a line CCD sensor 114. While illuminating the side to be read by a light source 111 and moving the glass table 116 by a pulse motor 115, light beams reflected from the original 117 are further reflected by the mirror 112 and then converged by the lens 113 to impinge on the line CCD sensor 114, thereby obtaining image signals corresponding to the information on the reflective original 117.

Originals from which information is to be read are not always reflective originals, but often transparent originals such as OHP films. When a transparent original is set onto a conventional optical reading apparatus for a reflective original, so as to read out information from the transparent original, all the light beams pass through the transparent original so that image signals representing black only are obtained. On the other hand, when a reflective original is set onto a conventional optical reading apparatus for a transparent original, light beams cannot pass through the reflective original, resulting in that information cannot be read from the reflective original. Optical reading apparatus which are capable of reading both reflective and transparent originals have been manufactured, but these are large in size and expensive.

SUMMARY OF THE INVENTION

The optical reading apparatus of this invention, which overcomes the above-discussed and numerous other disadvantages and deficiencies of the prior art, comprises a transparent plate for supporting on the upper face thereof an original from which information is to be read; a light source disposed below said plate; an optical reading unit disposed below said plate, said optical reading unit having means for converting information read from the original into electric signals; and process means for processing said signals, said reading apparatus further comprises: a further optical reading unit disposed above said upper face of said plate, and having means for converting information read from the original into further electric signals; and switch means for selecting either of said electric signals and said further electric signals to be supplied to said process means.

In a preferred embodiment, both of the electric signals and said further electric signals are analog signals.

In a preferred embodiment, the optical reading unit has attenuating means for attenuating the level of said electric signals.

In a preferred embodiment, the further optical reading unit has amplifying means for amplifying said further electric signals.

In a preferred embodiment, the level of said amplified further electric signal is greater than the level of said electric signals.

In a preferred embodiment, the optical reading unit reads information from light beams reflected from an original, and said further optical reading unit reads information from light beams transmitted through an original.

In a preferred embodiment, the optical reading unit has amplifying means and said further optical reading unit has further amplifying means, the degree of amplification of said amplifying means being equal to that of said further amplifying means.

In a preferred embodiment, the further optical reading unit is detachably mounted.

In a preferred embodiment, the switch means selects said further electric signals when said further optical reading unit is set.

Thus, the invention described herein makes possible the objectives of (1) providing a compact optical reading apparatus which can read information from both reflective and transparent originals; (2) providing an inexpensive optical reading apparatus which can read information from both reflective and transparent originals; and (3) providing an optical reading apparatus in which an optical reading unit for reading information from a transparent original is replaceable.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
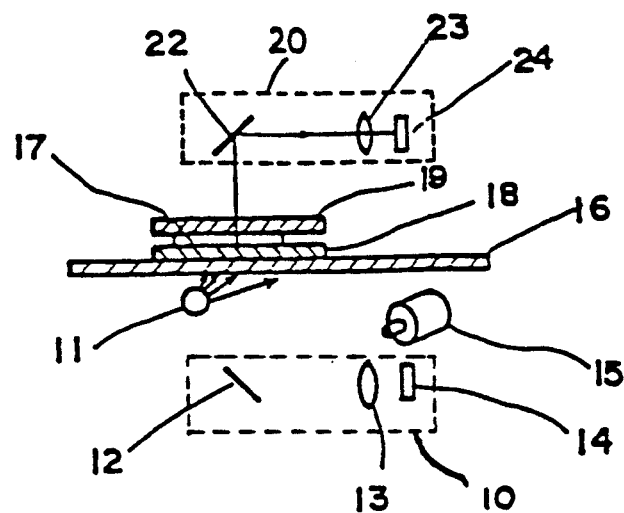
FIG. 1 is a diagram illustrating the configuration of an optical reading apparatus according to the invention.
Figure 10:
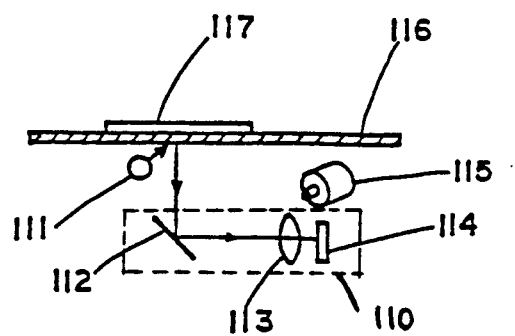
FIG. 10 is a diagram illustrating a conventional optical reading apparatus.

FIG. 1 shows an optical reading apparatus according to the invention. In the same way as the apparatus of FIG. 10, the apparatus of FIG. 1 comprises a transparent glass table 16 on which an original 17 is placed, a light source 11 disposed below the glass table 16, a pulse motor 15 for moving the glass table 16, and an optical reading unit 10 which includes a mirror 12, a lens 13 and a line CCD sensor 14 and is disposed beneath the glass table 16. The apparatus of FIG. 1 further comprises another optical reading unit 20 which includes a mirror 22, a lens 23 and a line CCD sensor 24, and is detachably supported above and in the vicinity of the glass table 16 by a suitable supporting member (not shown). A diffusion plate 18 for scattering light beams from the light source 11 is sandwiched between the glass table 16 and the original 17, and a transparent glass depressor plate 19 is disposed on the original 17 for holding the original against the glass table 16. The pulse motor 15 moves the glass table 16 on which the original 17 is placed, according to instructions from a control circuit described later.

When the original 17 is a transparent one, light beams emitted from the light source 11 is made uniform by the diffusion plate 18 and pass through the transparent original 17 and glass depressor plate 19, and the light path is bent by the mirror 22, after which the light beams are converged by the lens 23 and arrive at the line CCD sensor 24.

Figure 2:
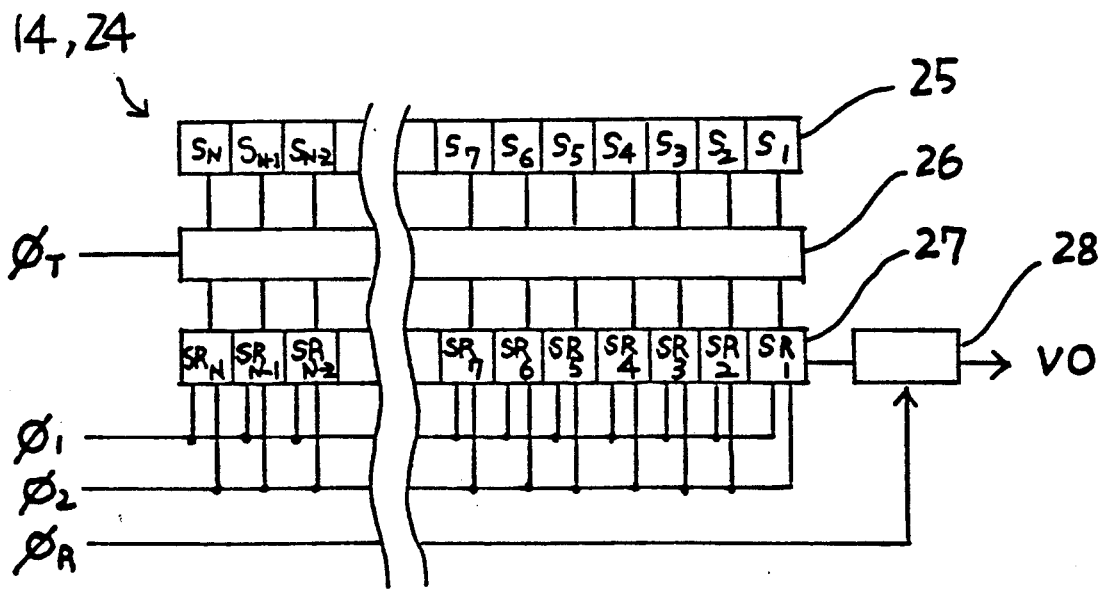
FIG. 2 is a block diagram of a line CCD sensor used in the apparatus of FIG. 1.
Figure 3:
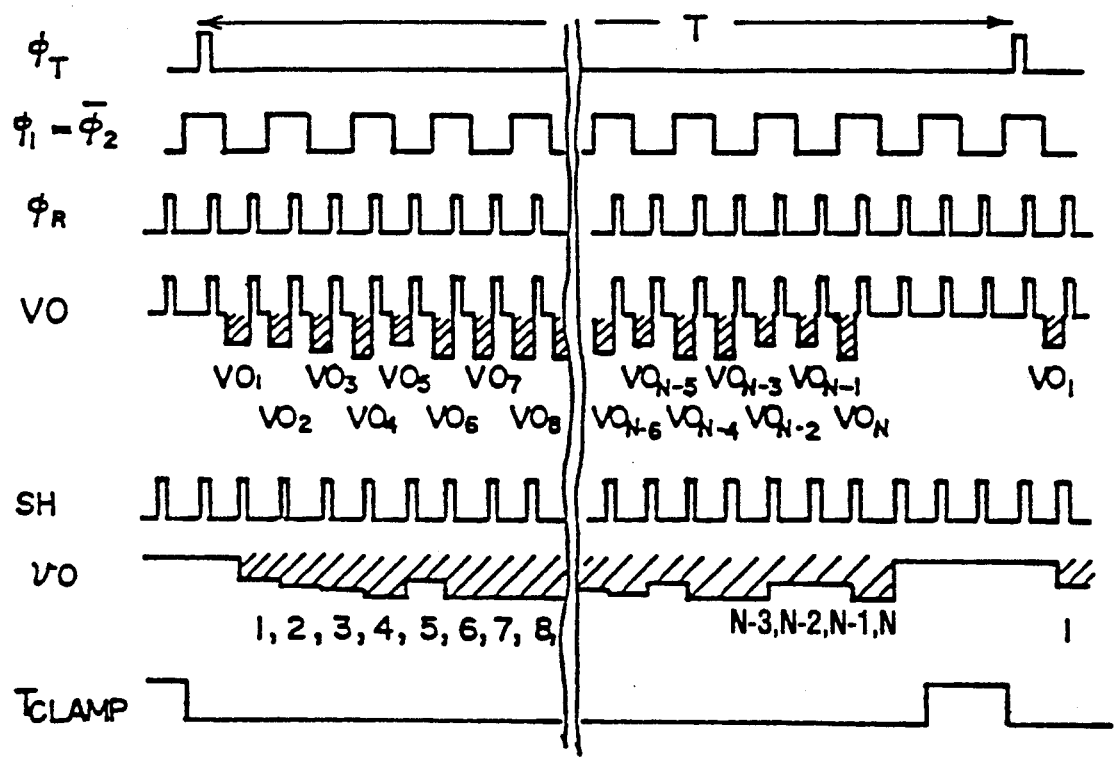
FIG. 3 is a timing chart illustrating the operation of the line CCD sensor of FIG. 2.

FIG. 2 illustrates the line CCD sensors 14 and 24. These line CCD sensors 14 and 24 comprise a line sensor unit 25 consisting of CCDs (Charge Coupled Devices) $S_1$-$S_N$, a transfer gate 26, an N-bit shift register set 27 consisting of analog shift registers $SR_1$-$SR_N$, and an output buffer 28. Electric charges generated by the photoelectric conversion in the CCDs $S_1$-$S_N$ are respectively transferred to the analog shift registers $SR_1$-$SR_N$ by a transfer pulse $\phi_T$ applied to the transfer gate 26, and then sequentially shifted to the output buffer 28 by shift clocks $\phi_1$ and $\phi_2$ following the transfer pulse $\phi_T$. In the output buffer 28, the charges are converted to a voltage signal VO. An electric charge which has been shifted into the output buffer 28 is reset by a reset pulse $\phi_R$ every time whenever another electric charge is newly shifted into the output buffer 28. Namely, a train of the signals VO is a voltage signal train, the level of which corresponds to the amounts of the electric charges generated in the CCDs $S_1$-$S_N$ during the previous scanning. The relationship between the pulses $\phi_T$, $\phi_1$, $\phi_2$ and $\phi_R$ and the voltage signal VO is shown in FIG. 3. In FIG. 3, vo is a voltage output which is obtained by sample-holding the voltage signals VO in accordance with a sample-hold signal /SH, and $T_{CLAMP}$ is a clamping signal which is described later.

Figure 4:
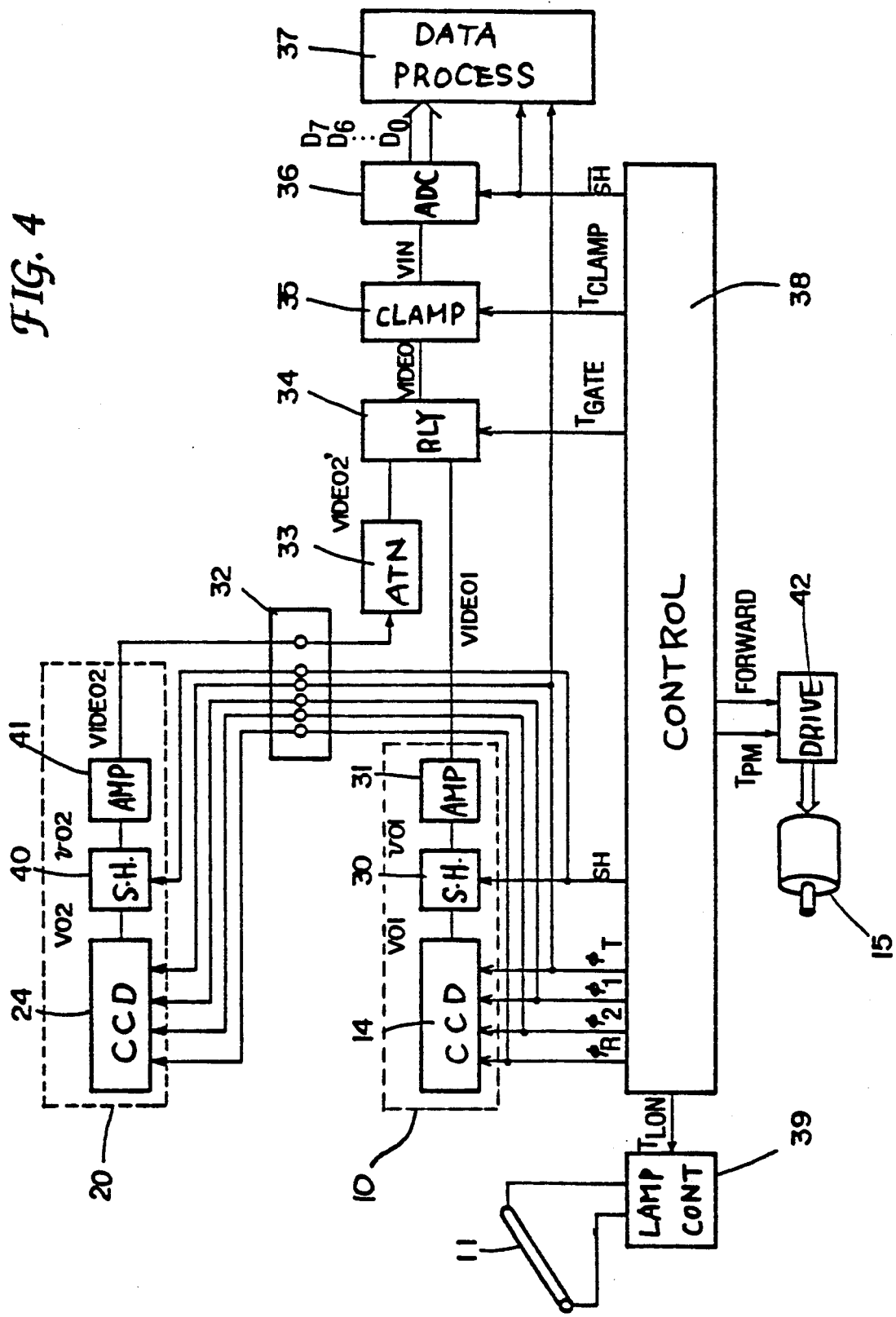
FIG. 4 is a block diagram of the apparatus of FIG. 1.

First, the arrangement of the embodiment will be briefly described with reference to FIG. 4. The line CCD sensor 14 of the optical reading unit 10 receives the pulses $\phi_T$, $\phi_1$, $\phi_2$ and $\phi_R$ from a control circuit 38 to supply a voltage signal VO1 to a samplehold circuit 30. The sample-hold circuit 30 samples and holds the voltage signal VO1 to generate an output signal vo1 which is then supplied to an amplifier 31. The amplifier 31 magnifies the level of the output signal vo1 to generate an analog signal VIDEO1 which is sent to a relay circuit 34. Similarly, the line CCD sensor 24 of the optical reading unit 20 receives the pulses $\phi_T$, $\phi_1$, $\phi_2$ and $\phi_R$ from a control circuit 38 to supply a voltage signal VO2 to a sample-hold circuit 40. The sample-hold circuit 40 samples and holds the voltage signal VO2 to generate an output signal vo2 which is then supplied to an amplifier 41. The amplifier 41 magnifies the level of the output signal vo2 to generate an analog signal VIDEO2 which is sent through a cable (not shown) to a connector 32.

Then, the analog signal VIDEO2 is input to an attenuator 33. The output VIDEO2' of the attenuator 33 is sent to the relay circuit 34. The relay circuit 34 to which the analog signals VIDEO1 and VIDEO2' are input selects either of the two signals in accordance with a signal TGATE supplied from the control circuit 38, to be supplied as a signal VIDEO to a clamping circuit 35.

The clamping circuit 35 shifts the voltage level of the signal VIDEO within the input range of an AD converter 36. The AD converter 36 converts the level-shifted signal into digital data at the rising edge of the sample-hold signal /SH. The AD converter 36 is an 8-bit converter, and the 8-bit outputs D7, D6, ..., D0 are sent to a data processing circuit 37. A lamp control circuit 39 lights the light source 11 when a signal TLON supplied from the control circuit 38 is HIGH.

When a pulse motor drive circuit 42 receives a pulse signal $T_{PM}$ once when a signal FORWARD is HIGH, the pulse motor 15 rotates one step clockwise to move the glass table 16 (FIG. 1) forward 1/600 of an inch. When the pulse signal TPM is received twice, the table 16 is moved forward 1/300 of an inch. The CCD sensor 24 of the optical reading unit 20 comprises 2,550 CCDs (i.e., N=2,550), which is the number required to read an 8.5 inch wide sheet at 300 dpi (8.5×300). In contrast, the CCD sensor 14 of the optical reading unit 10 comprises 2,550 CCD sensors so that a sheet of a 4.25 inch width can be read at a resolution of 600 dpi.

Figure 5:
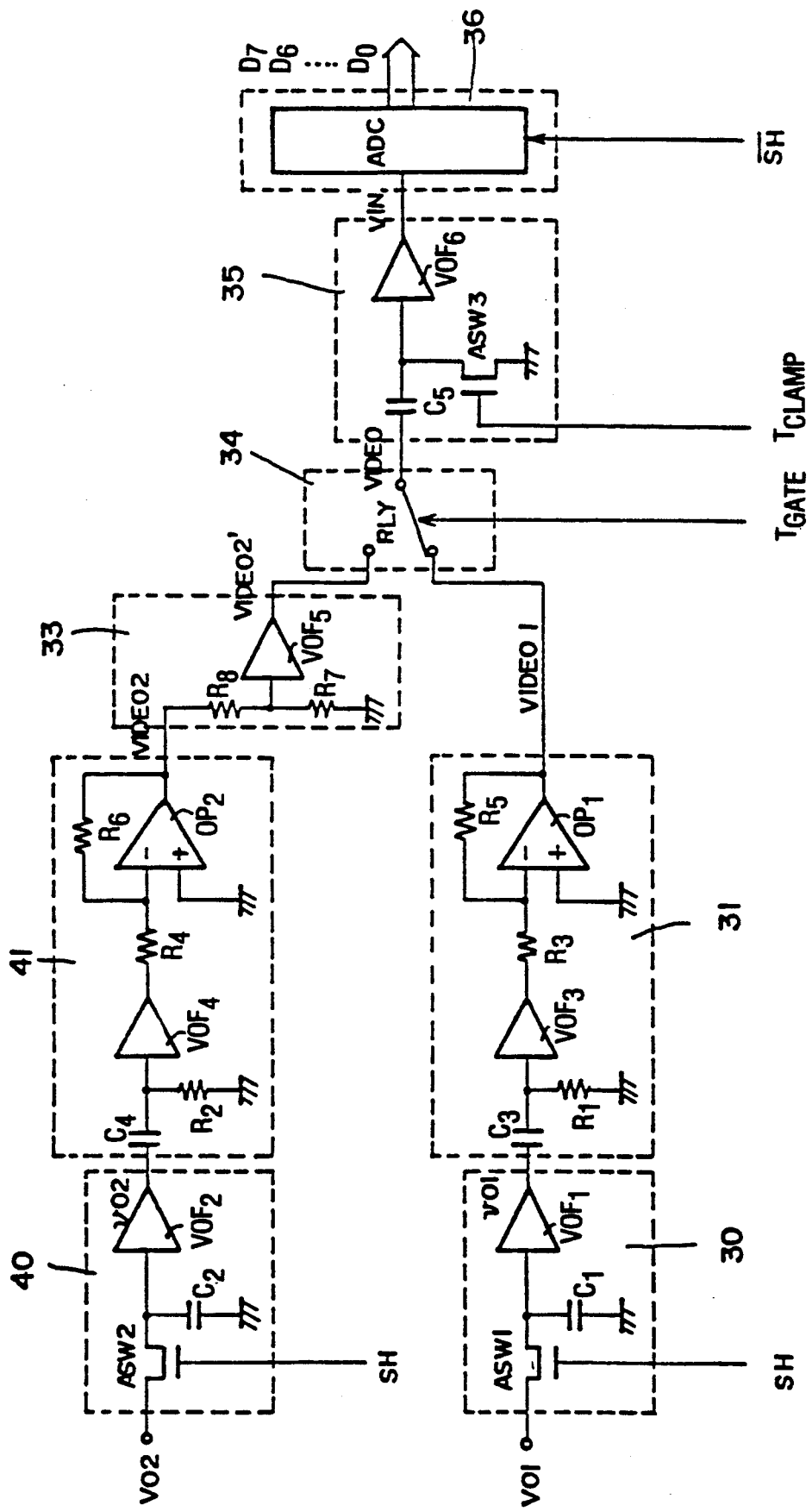
FIG. 5 is a circuit diagram of the apparatus of FIG. 1.

FIG. 5 shows the circuit configuration of the embodiment. In FIG. 5, ASW denotes an analog switch, VOF a voltage follower, OP an operational amplifier, RLY a relay, and ADC an AD converter.

Figure 6:
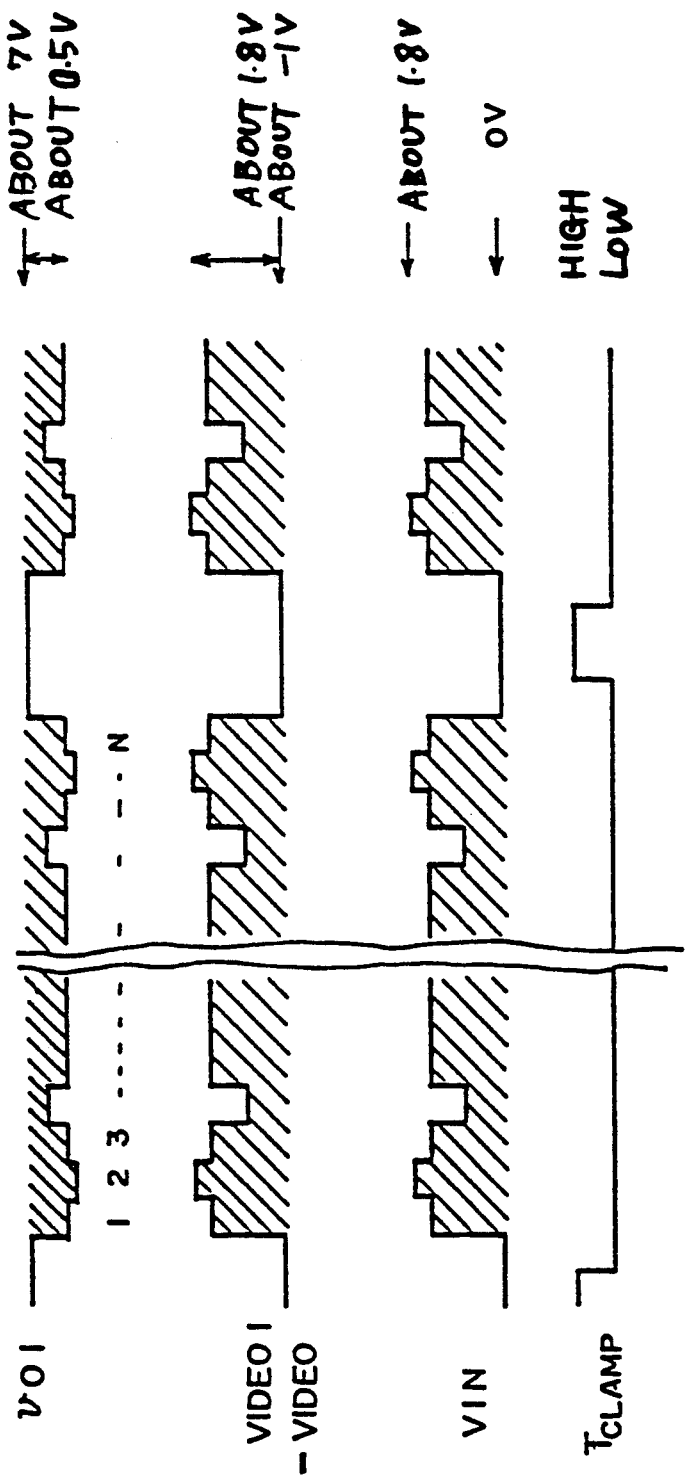
FIGS. 6 and 7 show waveforms in the apparatus of FIG. 1.

With reference to FIG. 5, the arrangement of the embodiment will be described in more detail. The sample-hold circuit 30 comprises an analog switch ASW1, a capacitor C1 and a voltage follower VOF1. The value of the time constant (C3×R1) of the amplifier 31 is sufficiently larger than the period T of the transfer pulse $\phi_T$. The combination of a capacitor $C_3$ and a resistor $R_1$ shifts the level of the output signal vo1 down from approximately 7 V to near 0 V as shown in FIG. 6, and then the output signal vo1 undergoes a 3.6-fold inverting amplification in the operational amplifier $OP_1$ (i.e., $R_5/R_3=3.6$) to become the analog signal VIDEO1.

The relay circuit 34 switches as follows:
when $T_{GATE}$ is LOW, VIDEO=VIDEO1,
when $T_{GATE}$ is HIGH, VIDEO=VIDEO2'.
That is, when the optical reading unit 20 for reading transparent originals is attached, the signal $T_{GATE}$ from the control circuit 38 is set HIGH.

In the clamping circuit 35, an analog switch ASW3 receives the signal $T_{CLAMP}$ from the control circuit 38, and the level of the signal VIDEO (approximately $-1$ V to $+0.8$ V) is shifted to be output as a signal VIN which is greater than 0 V. The signal VIN (from 0 V to $+1.8$ V) is input to the AD converter 36. The AD converter 36 converts the input signal VIN into digital data while changing the its level to 256 gradations from 0 V to 2 V, which is performed at the rise of the signal /SH.

Figure 7:
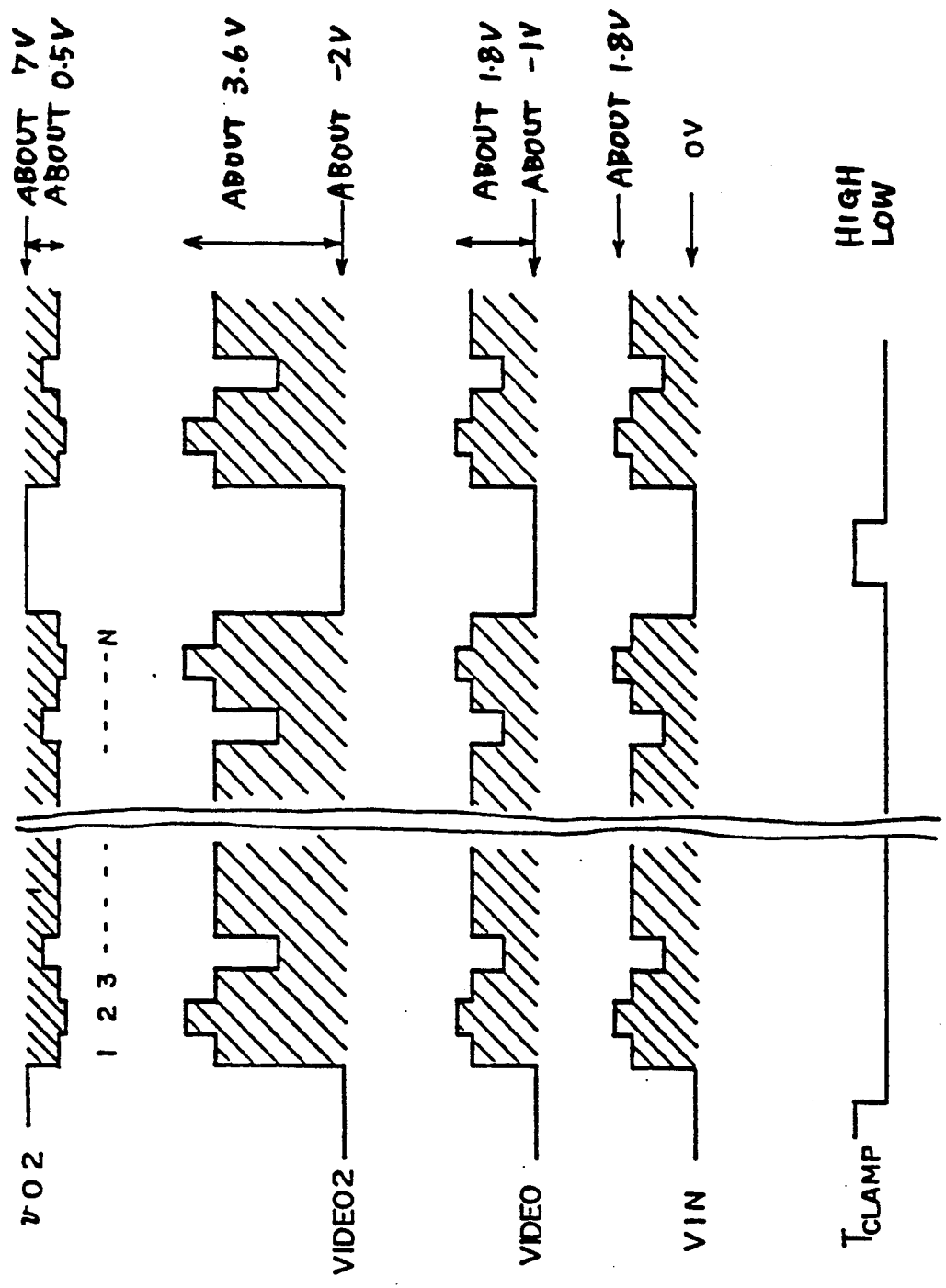

In the following, the operation of the embodiment when the optical reading unit 20 is attached to read a transparent original will be described. When a transparent original is read, the voltage output signal VO2 of the line CCD sensor 24 is sampled and held in the sample-hold circuit 40 to be output as the output signal vo2. Then, as shown in FIG. 7, the output signal vo2 is shifted down from approximately 7 V to near 0 V and then undergoes inverting amplification in the operational amplifier $OP_2$ to become the signal VIDEO2. The gain in this amplification is set at 7.2-fold, which is twice that in the reflection reading. The relationship between the resistors $R_6$ and $R_4$ in the amplifier 41 is $R_6/R_4=7.2$.

The reason for this is because the signal cable from the optical reading unit 20 is relatively long as compared with that from the optical reading unit 10, making the signal VIDEO2 susceptible to noise, so its output level is made greater.

The output signal VIDEO2 from the amplifier 41 is supplied to the attenuator 33 which comprises resistors $R_7$ and $R_8$. The resistances of the two resistors $R_7$ and $R_8$ are equal to each other so that the output signal VIDEO2' of the attenuator 33 is attenuated to one-half the input signal VIDEO2.

The signal VIDEO2' is sent to the clamping circuit 35 as the signal VIDEO via the relay circuit 34. In the clamping circuit 35, the analog switch ASW3 receives the signal $T_{CLAMP}$ from the control circuit 38, and the level of the signal VIDEO (approximately $-1$ V to $+0.8$ V) is shifted to be output as a signal VIN which is greater than 0 V. The signal VIN (from 0 V to $+1.8$ V) is input to the AD converter 36. The AD converter 36 converts the input level to 256 gradations from 0 V to 2 V, which is performed at the rising edge of the signal /SH.

Figure 8:
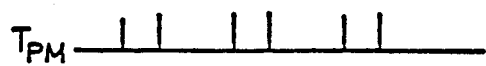
FIGS. 8 and 9 show the relationship between a pulse signal for a pulse motor and a transfer pulse in the apparatus of FIG. 1.
Figure 8:
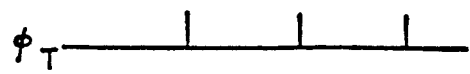
Figure 9:
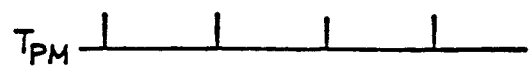
Figure 9:
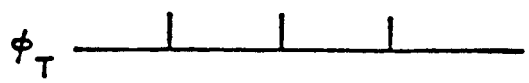

FIG. 8 shows the relationship between the pulse signal $T_{PM}$ and the transfer pulse $\phi_T$ during the reading of a reflective original, which is performed at a resolution of 300 dpi. FIG. 9 shows the relationship between the pulse signal $T_{PM}$ and the transfer pulse $\phi_T$ during the reading of a transparent original, which is performed at a resolution of 600 dpi. By replacing the optical reading unit 20 with another optical reading unit with another degree of reading resolution such as 300 dpi or 1200 dpi, the reading of a transparent original can be performed at any desired resolution.

When the electrical wiring from the optical reading unit (the optical reading unit 20) for a transparent original is long to a degree that the image information signal from the reading unit is susceptible to noise, a means (the amplifier 41) for amplifying the signal is provided in the above-described embodiment, so that the level of the signal from the reading unit for a transparent original is larger than that of the signal from the reading unit (the optical reading unit 10) for a reflective original. Moreover, the above-described embodiment is provided with a means (the attenuator 33) for attenuating the image information signal from the optical reading unit for a transparent original which signal has been amplified, thereby matching the output level with that of the image information signal from the reading unit for a reflective original, for the purpose of further signal processing. Consequently, the optical reading apparatus afore-described can be compact, manufactured at an inexpensive cost and is capable of accurately reading transparent originals with good resolution.

When the wiring from the optical reading unit for a transparent original is not so long or the problem of noise is not so serious, however, the amplifying means is not necessary, or alternatively the degree of amplification can be decreased.

The gain or degree of amplification of the amplifier 41 may be equal to that of the amplifier 31. In this case, the attenuator 33 is not provided, and the signal VIDEO 2 is directly input to the relay circuit 34.

According to the invention, both transparent and reflective originals can be read with one inexpensive and compact optical reading apparatus. Furthermore, transparent originals can be read at a desired resolution by replacing the optional optical unit with one with a different reading resolution.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In an optical reading apparatus comprising: a transparent plate having an upper face for supporting an original thereon from which information is to be read; a light source disposed below said plate; an optical reading unit disposed below said plate, said optical reading unit having means for converting information read from the original into electric signals and process means for processing said signals, said reading apparatus further comprises:

a further optical reading unit disposed above said upper face of said plate, and having means for converting information read from the original into further electric signals; and switch means for selecting either of said electric signals and said further electric signals to be supplied to said process means, wherein both of said electric signals and said further electric signals are analog signals, and wherein said further optical reading unit has attenuating means for attenuating the level of said electric signals.

2. In an optical reading apparatus comprising: a transparent plate having an upper face for supporting an original thereon from which information is to be read; a light source disposed below said plate; an optical reading unit disposed below said plate, said optical reading unit having means for converting information read from the original into electric signals; and process means for processing said signals, said reading apparatus further comprises:

a further optical reading unit disposed above said upper face of said plate, and having means for converting information read from the original into further electric signals; and switch means for selecting either of said electric signals and said further electric signals to be supplied to said process means, wherein both of said electric signals and said further electric signals are analog signals, wherein said further optical reading unit has amplifying means for amplifying said further electric signals, and wherein the level of said amplified further electric signals is greater than the level of said electric signals.

3. In an optical reading apparatus comprising: a transparent plate having an upper face for supporting an original thereon from which information is to be read; a light source disposed below said plate; an optical reading unit disposed below said plate, said optical reading unit having means for converting information read from the original into electrical signals; and process means for processing said signals, said reading apparatus further comprises:

a further optical reading unit disposed above said upper face of said plate, and having means for converting information read from the original into further electric signals; and switch means for selecting either of said electric signals and said further electric signals to be supplied to said process means, wherein both of said electric signals and said further electric signals are analog signals, and wherein said optical reading unit has amplifying means and said further optical reading unit has further amplifying means, the degree of amplification of said amplifying means being equal to that of said further amplifying means.

4. In an optical reading apparatus comprising: a transparent plate having an upper face for supporting an original thereon from which information is to be read; a light source disposed below said plate; an optical reading unit disposed below said plate, said optical reading unit having means for converting information read from the original into electric signals; and process means for processing said signals, said reading apparatus further comprises:

a further optical reading unit disposed above said upper face of said plate, and having means for converting information read from the original into further electric signals; and switch means for selecting either of said electric signals and said further electric signals to be supplied to said process means, and wherein said further optical reading unit is detachably mounted.

5. An optical reading apparatus according to claim 4 wherein said switch means is controlled to select said further electric signals to be supplied to said processing means when said further optical reading unit is mounted.

* * * * *

UNITED STATES PATENT AND TRADEMARK OFFICE
CERTIFICATE OF CORRECTION

PATENT NO. : 5,126,860
DATED : June 30, 1992
INVENTOR(S) : Fumikazu Nagano

It is certified that error appears in the above-indentified patent and that said Letters Patent is hereby corrected as shown below:

Column 6, Claim 1, line 19, following "electric signals" insert a semicolon--.

Signed and Sealed this

Seventeenth Day of August, 1993

Attest:

BRUCE LEHMAN

Attesting Officer          Commissioner of Patents and Trademarks